(12) United States Patent
Zigler et al.

(10) Patent No.: US 6,213,400 B1
(45) Date of Patent: Apr. 10, 2001

(54) ANTENNA/DOOR MODULE AND METHOD

(75) Inventors: Robert A. Zigler, Marysville; Edward L. Sheufelt, Seattle, both of WA (US)

(73) Assignee: Intermec Technologies Corporation, Everett, WA (US)

( * ) Notice: Subject to any disclaimer, the term of this patent is extended or adjusted under 35 U.S.C. 154(b) by 0 days.

(21) Appl. No.: 09/021,628

(22) Filed: Feb. 10, 1998

(51) Int. Cl.$^7$ ................................. G06K 7/10; G06K 9/22
(52) U.S. Cl. ................................. 235/462.45; 235/462.43
(58) Field of Search ........................... 235/462.45, 462.46, 235/462.47, 462.13, 462.43; 361/814; 343/702, 872

(56) References Cited

U.S. PATENT DOCUMENTS 5,515,303 * 5/1996 Cargin, Jr. et al. ............... 364/708.1

* cited by examiner

Primary Examiner—Karl D. Frech
(74) Attorney, Agent, or Firm—Joan H. Pauly

(57) ABSTRACT

A scanning device has a field-replaceable antenna provided in a door/antenna module. The housing of the device has an outer shell defining an interior space and an access opening extending through the shell and communicating with the space. The door is removably secured to an outer surface of the shell and covers the access opening. An antenna is carried by the door and has a cable extending therefrom into the space. The cable has an outer end with a connector configured to engage a component located in the space. The door is attached to the shell by means of a pair of screw fasteners. The antenna may be externally and pivotally mounted on the door or mounted internally in the door. Preferably, the door has a gasket that seals against an outer surface of the shell to seal the access opening.

26 Claims, 6 Drawing Sheets

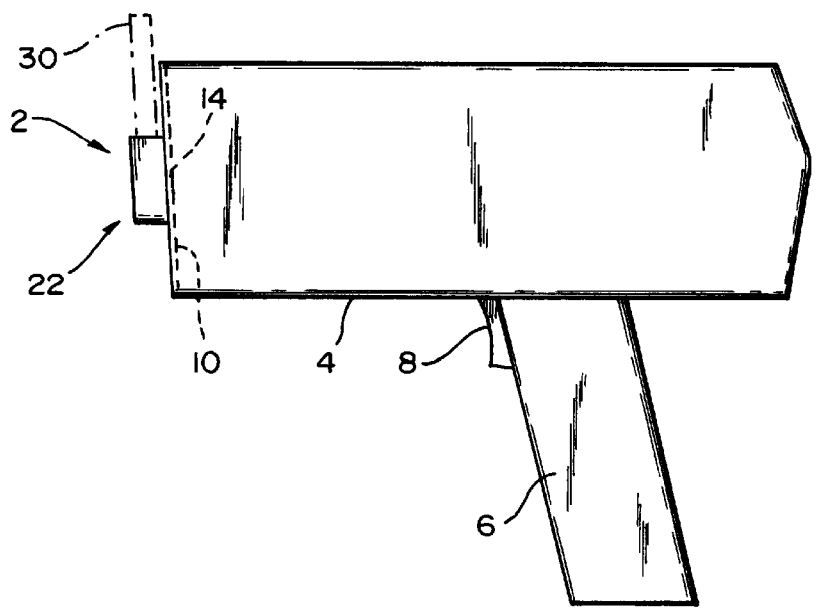
FIG. 1
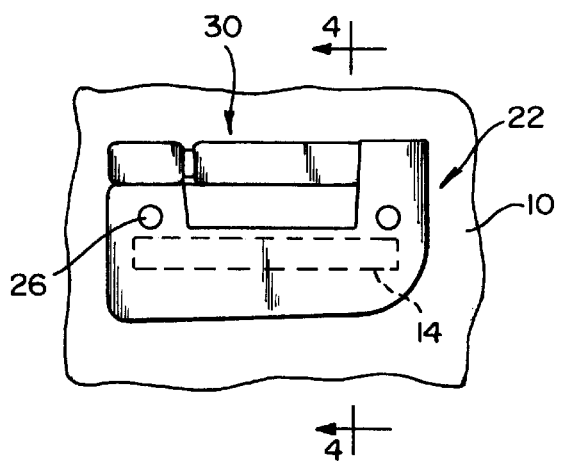
FIG. 2
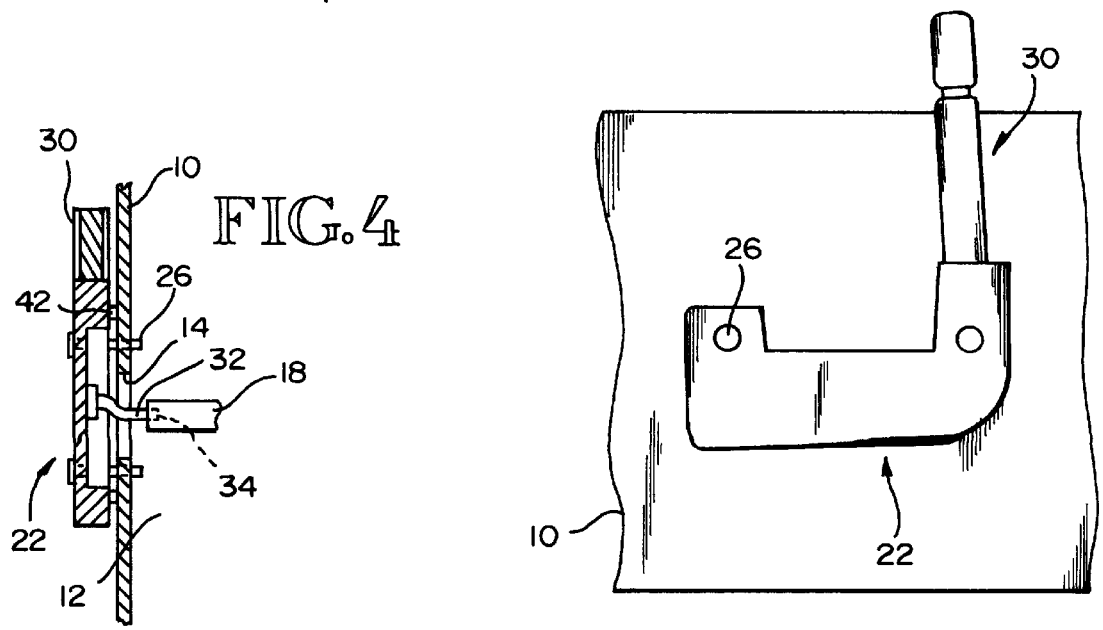
FIG. 4
FIG. 3

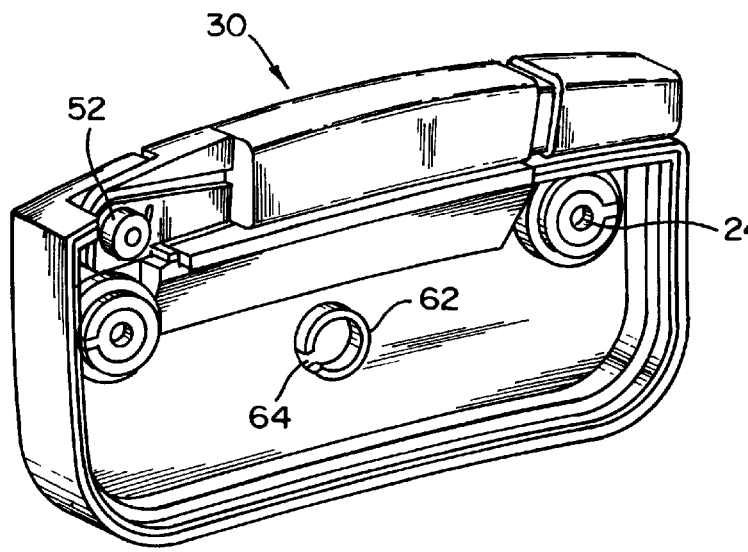
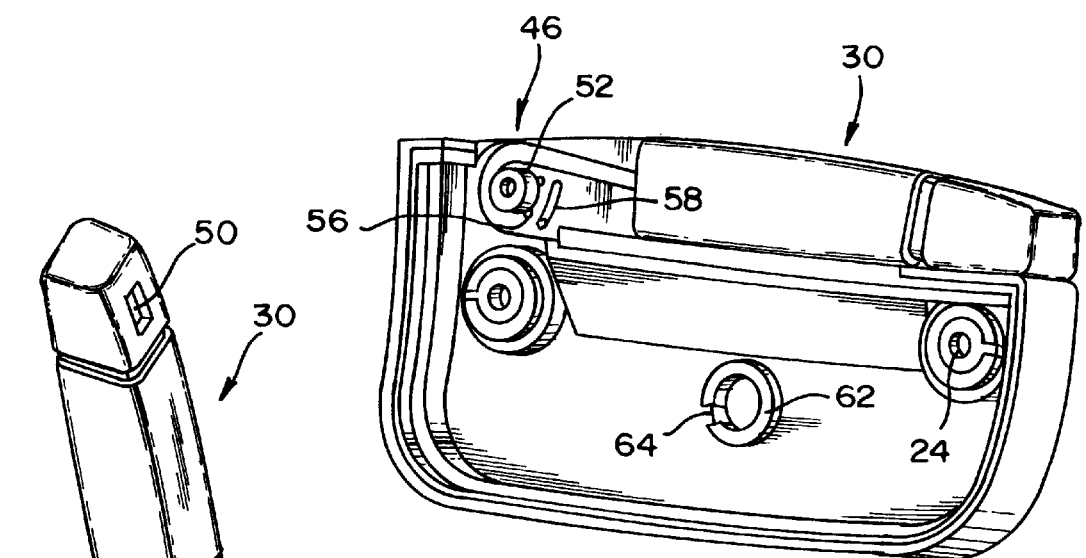
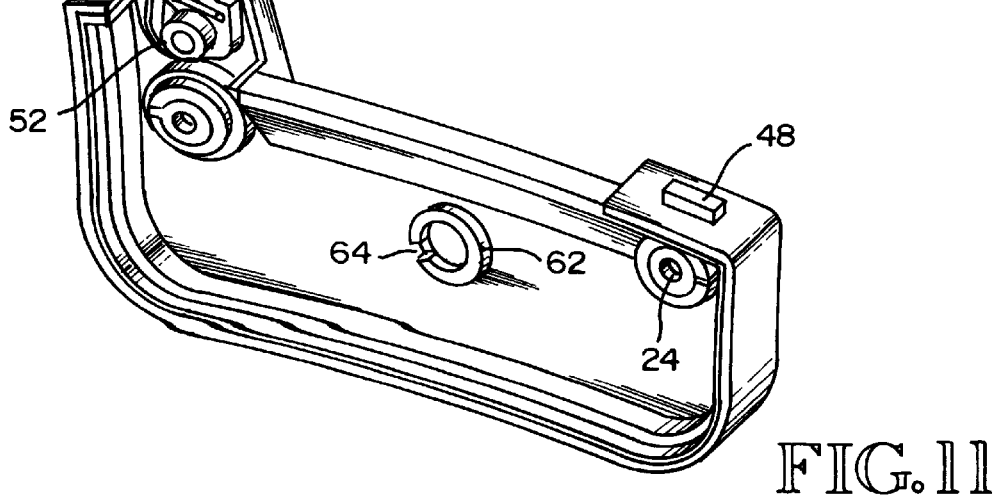

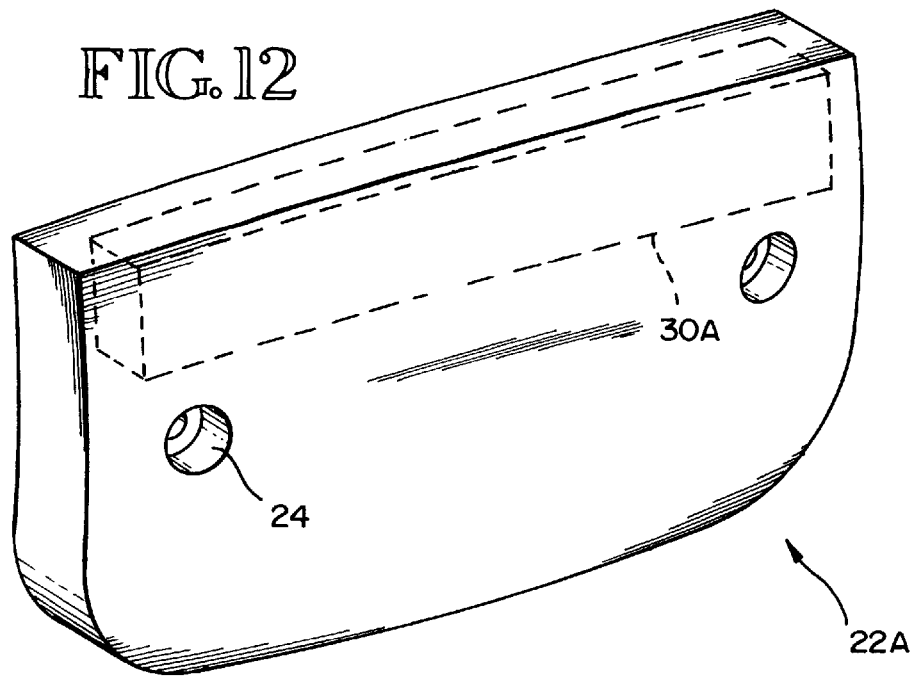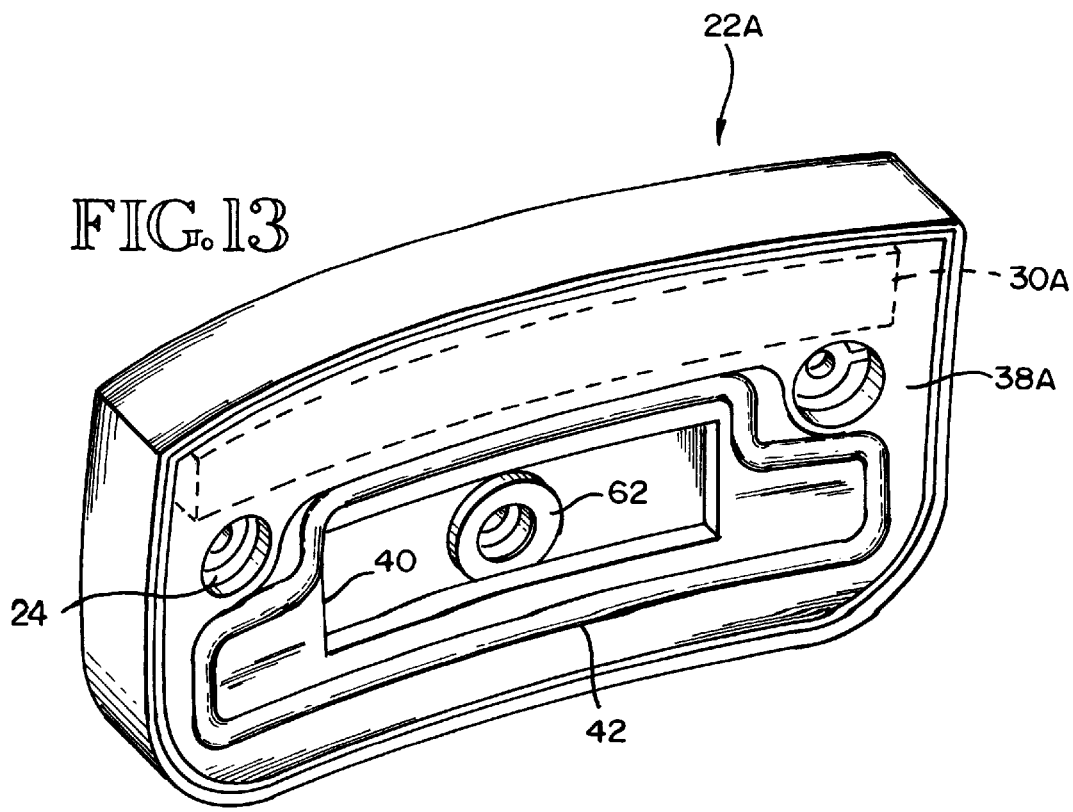

ANTENNA/DOOR MODULE AND METHOD

TECHNICAL FIELD

This invention relates to scanning devices and, more particularly, to a scanning device having a field-replaceable antenna mounted on a door that is removably secured to the housing of the device and covers an access opening in the housing.

BACKGROUND INFORMATION

Inventory control in various industries is greatly facilitated by the use of bar codes on inventory items. In the field, such as in a warehouse or shipping station, the movement of an item can be tracked by reading the bar code and storing and/or relaying the information to a centralized computer. The relaying of information from a scanning device to a host computer may be accomplished by radio frequency transmissions. Such transmissions require an antenna connected to relevant components of the scanning device.

Practical considerations have led to a standard requirement that antennas associated with scanning devices be field-replaceable. They must be relatively quickly and easily replaceable without requiring disassembly of the device. A conventional approach to providing a field-replaceable antenna is to mount the antenna on the side of a hand-held scanning device and connect the antenna to the internal components of the device by a series of connectors. The use of a plurality of connectors tends to add to the overall cost of the device and also potentially degrades the performance of the antenna and related radio components.

SUMMARY OF THE INVENTION

According to an aspect of the invention, a scanning device comprises a housing, a door, and an antenna. The housing has an outer shell defining an interior space and an access opening. The access opening extends through the shell and communicates with the interior space for receiving an often serviced component therethrough. The door is removably secured to an outer surface of the shell and covers the access opening. The antenna is carried by the door and has a cable extending therefrom into the interior space. The cable has an outer end with a connector configured to engage a component located in the interior space.

The door may be secured in various ways. Currently, it is preferably secured by a pair of screw-type fasteners extending through the door and threadedly engaging the shell to removably secure the door to the shell. This arrangement provides a secure and reliable attachment of the door to the housing which is readily engaged and disengaged in the field. Replacement of the antenna by replacing the door requires only the removal of the two screws and then the securing of a second door to the housing shell by again threading the screws into the shell. This procedure may be followed as often as is necessary.

The manner in which the antenna is mounted on the door may also be varied. A major factor determining how the antenna is mounted is the performance requirements in a particular situation. In one embodiment, the antenna is mounted internally in the door. In another embodiment, the antenna is pivotally mounted on the door. Preferably, in the latter embodiment, the antenna is pivotable by a user when the door is secured to the shell. The antenna is pivotable between a lowered position adjacent and parallel to an edge of the door, and a raised position projecting substantially perpendicularly from the edge along the outer surface of the shell.

A preferred feature of the invention is a gasket carried by the door and sealingly engaging the outer surface of the shell. The gasket is positioned and configured to surround the access opening to prevent entry of environmental contaminants into the opening. In the preferred embodiment, the gasket surrounds an area of the outer surface including the access opening, and the device comprises a pair of screw-type fasteners, as described above. The fasteners securely hold the door in position and urge the gasket into sealing engagement with the outer surface of the shell.

Another preferred feature of the invention is a recess on the door positioned to confront and substantially align with the access opening. The antenna cable extends from the door through the recess. The recess is configured to receive excess length of cable. When the recess is provided in combination with the gasket, the recess is preferably surrounded by the gasket.

According to another aspect of the invention, a hand-held scanning device has the characteristics described above. The access opening in the scanning device receives a memory card therethrough. The connector on the outer end of the antenna cable is configured to engage a memory card located in the interior space. The hand-held scanning device may be provided with the alternative and preferred features discussed above.

Another aspect of the invention relates to a method of providing a hand-held scanning device with a field-replaceable antenna and enabling switching the mode of operation of the device in the field. The device is of a type having a shell defining an interior space and an access opening communicating with the space. According to this aspect of the invention, the method comprises positioning a memory card in the space through the access opening. An antenna is mounted on a door. The antenna is connected to the memory card. The door is secured to an outer surface of the shell so that the access opening is covered by the door.

The mode of operation of the device may be changed in the field simply by replacing the door with a different door with a different antenna mounted thereon. It may also be changed to an antenna-less mode of operation by replacing the door with a second door lacking an antenna. In such case, the second door preferably has a slot that aligns with the access opening to permit a memory card to be moved into and out from the space through the slot and access opening without removing the second door from the outer surface of the shell. A removable plug is placed in the slot to protect the space from contaminants.

As used herein, the term "scanning device" is intended to mean various types of scanners for symbologies, including both one and two dimensional bar codes. It also includes various other types of devices for receiving and transmitting and/or storing identifying information. For example, the device may be designed to receive radio frequency (RF) information, such as RF signals received from identification tags worn by personnel in a particular area. The term "often serviced component" refers to a component of a scanning device that is required to be accessible for servicing in the field without disassembly of the device or other undue effort. One example of such a component is a memory card or PCMCIA of a type commonly found in scanning devices for bar codes.

Devices constructed according to the invention and the method of the invention provide an improved arrangement for a field-replaceable antenna. They also facilitate switching the mode of operation of a scanning device in the field. The method and apparatus of the invention maintain the required field replaceability of the antenna and, at the same time, help decrease the cost and increase the reliability of the device.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is an elevational view of a type of hand-held bar code reader into which the apparatus of the invention may be incorporated, showing the first preferred embodiment of the door in partially schematic form and the raised position of the antenna in broken lines.

FIG. 2 is a fragmentary front elevational view of the apparatus shown in FIG. 1 with the antenna in its lowered position.

FIG. 3 is like FIG. 2 except that it shows the antenna in its raised position.

FIG. 4 is a sectional view taken substantially along the line 4—4 in FIG. 2.

FIG. 9 is a pictorial view looking toward the rear of the door shown in FIGS. 5–8 with the rear cover of the door and the rear half of the antenna pivot base omitted.

FIG. 10 is like FIG. 9 looking at the rear of the door from a different angle.

FIG. 11 is like FIG. 10 except that it shows the antenna in its raised position.

FIG. 12 is a pictorial view looking toward the front of a second preferred embodiment of the invention.

FIG. 13 is a pictorial view looking toward the rear of the door shown in FIG. 12.

BEST MODES FOR CARRYING OUT THE INVENTION

Figure 5:
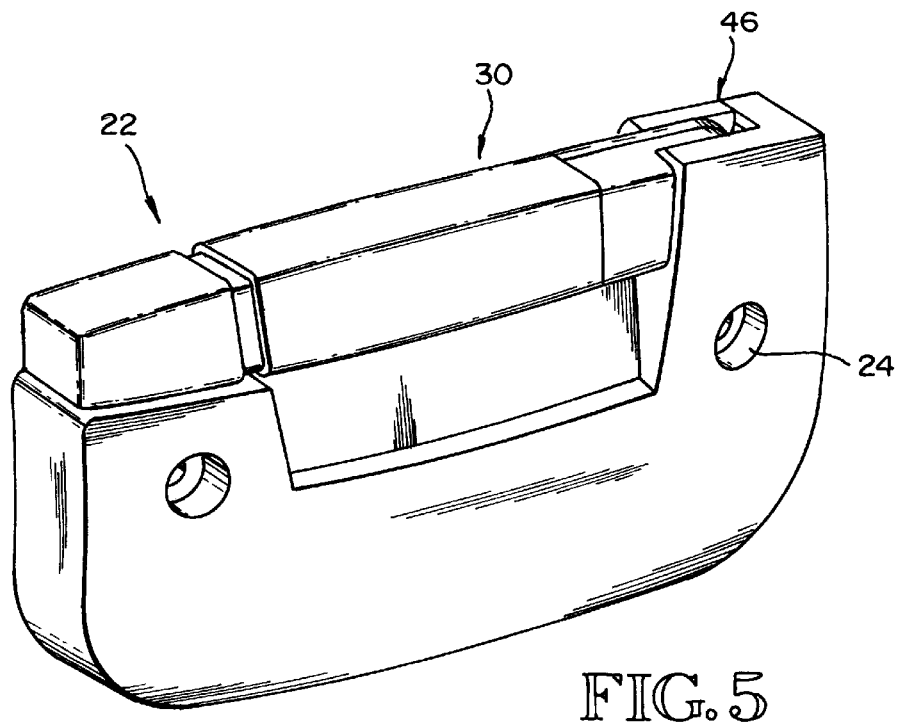
FIG. 5 is a pictorial view of the first preferred embodiment of the door, looking toward the front of the door.

The drawings illustrate apparatus that is constructed according to the invention and that also constitutes the best modes for carrying out the invention currently known to the applicants. FIG. 1 illustrates a common type of bar code reader 2 into which the door and antenna of the invention are incorporated. The reader 2 is shown for the purposes of illustration. It is intended to be understood that the door/antenna module of the invention may also be incorporated to advantage in various other types of scanning devices.

Referring to FIG. 1, the bar code reader 2 shown therein has a housing 4 sized and shaped to be held in a user's hand. For this purpose, the housing 4 is provided with a handle 6.

A trigger 8 is positioned on an upper portion of the handle 6 for easy operation of the reader 2 in a known manner. Referring to FIGS. 1–4, the barrel portion of the housing 4 has an outer shell 10 that defines an interior space 12. An access opening 14 extends through the shell 10 and communicates with the space 12. The opening 14 allows an often serviced component to be moved into and out of the space 12 without disassembly of the device 2. An example of such a component is the memory card 18 shown in FIG. 4.

As described above, the invention provides a scanning device with a field-replaceable antenna by providing a door/antenna module. A first preferred embodiment of the door/antenna module is shown in FIGS. 1–11. The door 22 of the module is designed to be removably secured to an outer surface of the shell 10 and cover the access opening 14. In the preferred embodiments of the invention, the connection is made by means of two laterally spaced fastener openings 24 that extend through the door 22. Each opening 24 receives a screw-type fastener 26 that extends through the corresponding opening 24 in the door 22 and threadedly engages the shell 10 to removably secure the door 22 to the shell 10. The fastener connection is illustrated in FIG. 4. The use of screw fasteners enables quick and easy attachment of the door 22 to the shell 10, detachment of the door 22 from the shell 10, and, when desired, reattachment of the door 22 to the shell 10.

In accordance with the invention, an antenna 30 is carried by the door 22. As shown in FIGS. 1–11, the antenna 30 is pivotally mounted on the door 22. The antenna 30 is pivotable by a user, when the door 22 is secured to the shell 10, between a lowered position adjacent and parallel to an edge of the door 22, and a raised position projecting substantially perpendicularly from said edge along the outer surface of the shell 10. The lowered position is illustrated in FIGS. 2, 4–6, 9, and 10. The raised position is illustrated in broken lines in FIG. 1 and in solid lines in FIGS. 3, 7, 8, and 11. The illustrated antenna 30 has a fixed, non-telescoping configuration with surface features for decoration.

Figure 6:
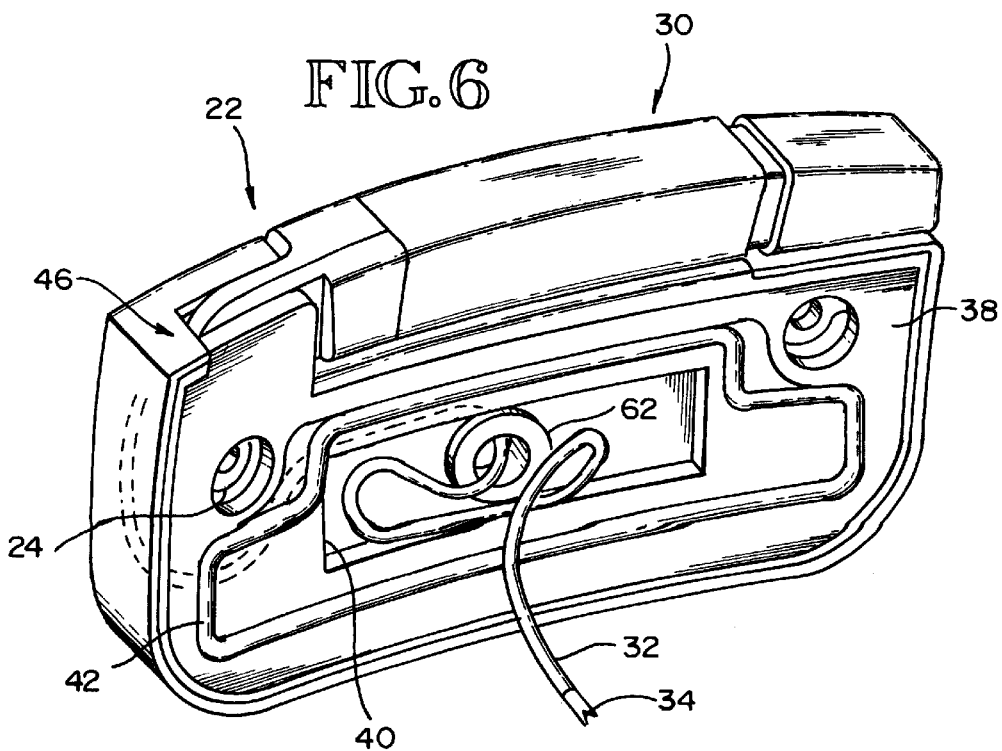
FIG. 6 is a pictorial view of the door shown in FIG. 5 looking toward the rear of the door.

Referring to FIGS. 4 and 6, an antenna cable 32 extends from the antenna 30 and from the door 22 into the interior space 12 of the scanning device 2. The outer end of the cable 32 has a connector 34 attached thereto. Such a connector is shown generically in FIGS. 4 and 6. The connector 34 is configured to engage a component located in the space 12. Preferably, the connector 34 plugs directly into the corresponding component. As shown, the connector 34 plugs into the memory card 18, which may be, for example, a communications card that is part of the radio incorporated into the device 2 to transmit scanned information therefrom.

Figure 8:
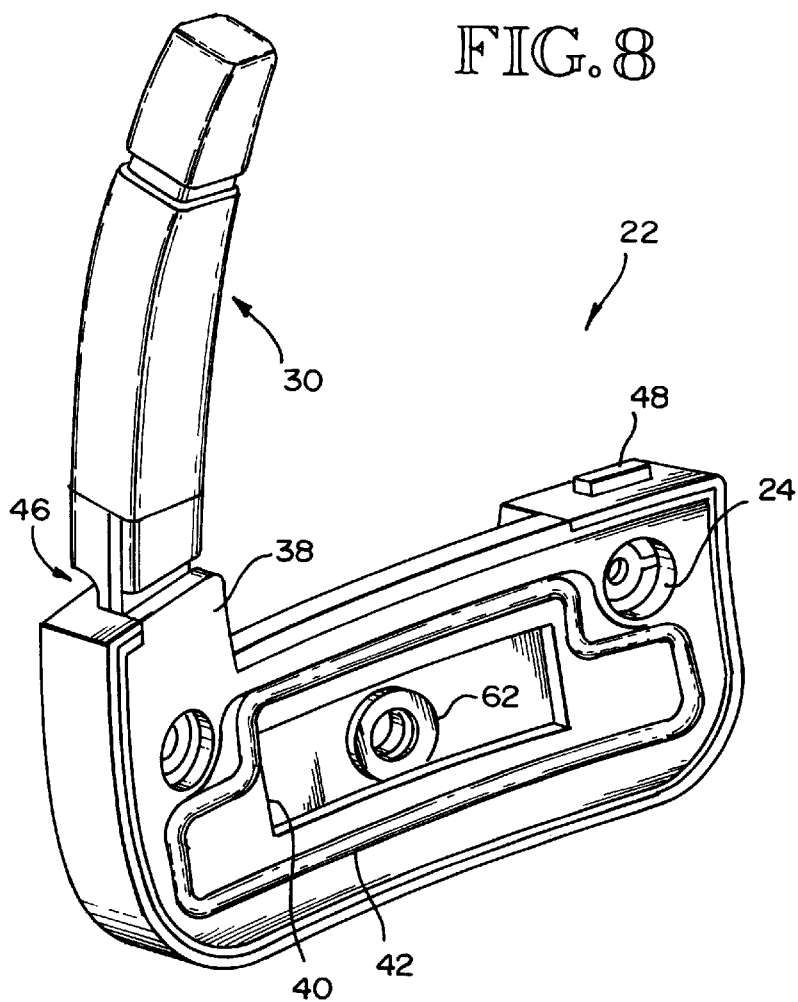
FIG. 8 is like FIG. 6 except that it shows the antenna in its raised position and omits the antenna cable to more clearly illustrate the door structure.
Figure 7:
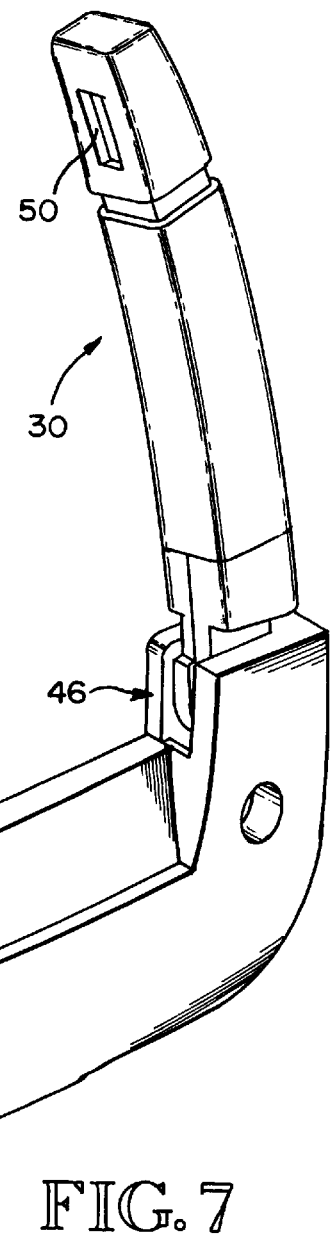
FIG. 7 is like FIG. 5 except that it shows the antenna in its raised position.

Referring to FIGS. 6 and 8, the door 22 includes a rear cover 38. The cover 38 has a window or recess 40 formed therein positioned to confront and substantially align with the access opening 14. Preferably, the door 22 includes a gasket 42 carried by the rear cover 38 and sealingly engaging the outer surface of the shell 10. The gasket is urged by the fasteners 26 against the outer surface to provide a sealing engagement and prevent entry of environmental contaminants into the access opening 14. The gasket 42 surrounds an area of the outer surface including the opening 14. The recess 40 on the door 22 provided by the opening in the rear cover 38 is also surrounded by the gasket 42. The fasteners 26 are located outside the door area and the area of the shell 10 surrounded by the gasket 42. The gasket 42 may take various forms, such as an O-ring configuration or a flat ribbon-like configuration.

The antenna cable 32 extends from the door 22 through the recess 40 and out into the space 12. As illustrated in FIG.

6, the recess 40 is configured to receive excess length of cable 32. This facilitates connection of the cable 32 to the interior component and ensures that the cable 32 does not interfere with the sealing engagement of the door 22 with the shell 10. Referring to FIGS. 6 and 9–11, the cable 32 extends from the antenna 30 into a substantially cylindrical boss 62 projecting rearwardly from the rear interior surface of the front wall of the door 22. This boss 62 has a radial slot 64 extending therethrough, as shown in FIGS. 9–11. In the assembled door 22, the cable 32 extends from the antenna 30 axially into the boss 62 and radially out of the boss 62 through the slot 64. It then winds around the interior of the door 22 in the recess 40 as necessary to accommodate excess length. Finally, it extends out of the door through the recess 40 and into the interior space 12 of the device 2.

The pivot connection 46 between the antenna 30 and the door 22 is shown in more detail in FIGS. 9–11. The antenna 30 has a first end pivotally attached to the door 22. The second opposite free end of the antenna 30 has a socket 50 formed therein. The socket 50 is configured to engage a projection 48 formed on the edge of the door 22 when the antenna 30 is in the lowered position illustrated in FIGS. 2, 4–6, 9, and 10. The engagement of the projection 48 in the socket 50 serves to maintain the antenna 30 in position and prevents undesired deflection of the antenna 30 when it is in its lowered position. The projection 48 and socket 50 can best be seen in FIGS. 7, 8, and 11.

Referring to FIGS. 9–11, the pivotally attached end of the antenna 30 is mounted to pivot about an axis defined by a detent post 52 attached to the rear cover 38 of the door 22 (not shown in FIGS. 9–11). The post 52 provides a detent mechanism that engages depressions 54, 56 in the antenna 30 to hold the antenna 30 in each of its lowered and raised positions. FIG. 11 illustrates the engagement of the depression 54 in the antenna 30 to hold the antenna 30 in its raised position. FIG. 10 illustrates the engagement of the depression 56 to hold the antenna in its lowered position. This type of detent mechanism is well-known in the art and may be varied to suit the needs of a particular situation. Also shown in FIGS. 9–11 is an arcuate slot 58 on the inner surface of the portion of the pivotal end of the antenna 30 shown in FIGS. 9–11. This slot 58 serves as a guide for the connection between the illustrated portion of the antenna end and the portion omitted in FIGS. 9–11. The omitted end portion of the antenna 30 has a suitable opening therethrough for pivotally receiving the detent post 52.

FIGS. 12 and 13 show a second preferred embodiment of the invention. In this embodiment, the antenna 30A is fixedly mounted internally in the door 22A. This difference in the mounting of the antenna 30A has a corresponding difference in the configuration of the rear cover 38A of the door 22A. In other respects, the door 22A is structured and functions in the same manner as the door 22 shown in FIGS. 1–11.

The invention encompasses a method as well as the apparatus described above. The method is one of providing a hand-held scanning device with a field-replaceable antenna and enabling switching the mode of operation of the device in the field. In accordance with the method, a memory card or other often serviced component is positioned in the interior space 12 of the device 2 through an access opening 14. An antenna 30, 30A is mounted on a door 22, 22A. The antenna 30, 30A is then connected to the component 18, such as by plugging the connector 34 on the end of the antenna cable 32 into the memory card 18. When the cable connection has been made, the door 22, 22A is secured to the outer surface of the scanning device shell 10. The securing of the door 22, 22A is preferably accomplished by tightening screw-type fasteners 26. The door 22, 22A is secured to the outer shell surface in a position in which it covers the access opening 14.

By use of the method of the invention, the antenna may quickly and easily be incorporated into the device 2 and may be serviced and/or replaced in the field without the need for disassembly of the device 2. The method of the invention provides an improved arrangement for a field-replaceable antenna for a scanning device and also increases the versatility of the device. The device may be repaired and/or adapted to a different use by replacing the antenna. It may further have its mode of operation switched to an antennaless mode of operation, such as operation as a batch type bar code terminal.

Figure 14:
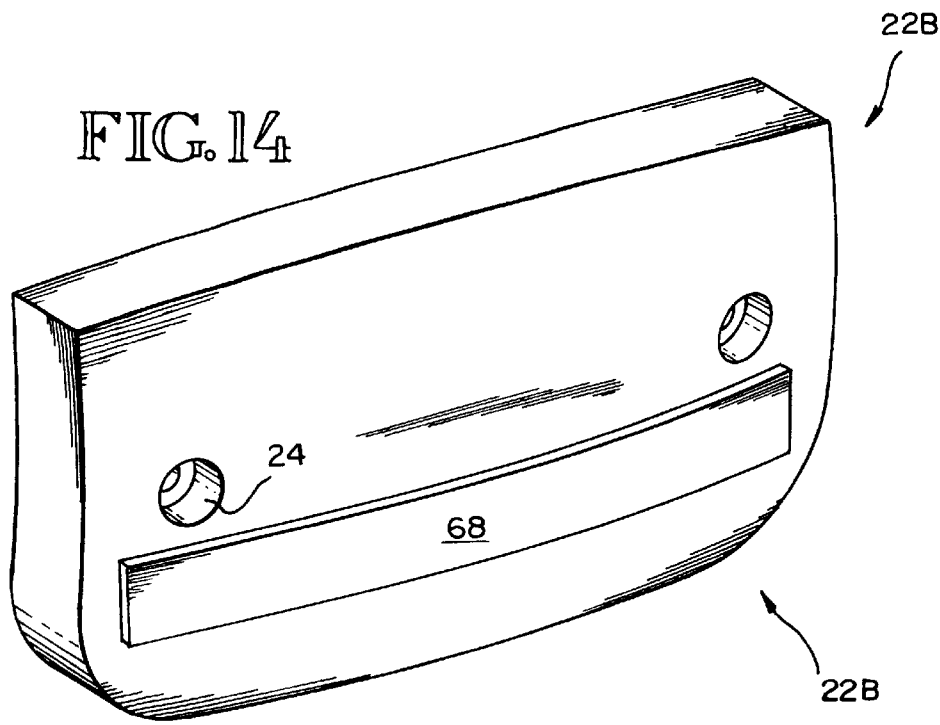
FIG. 14 is a pictorial view looking toward the front of an antenna-less door that may be used in accordance with the method of the invention to convert the mode of operation of the scanning device to an antenna-less mode of operation.
Figure 15:
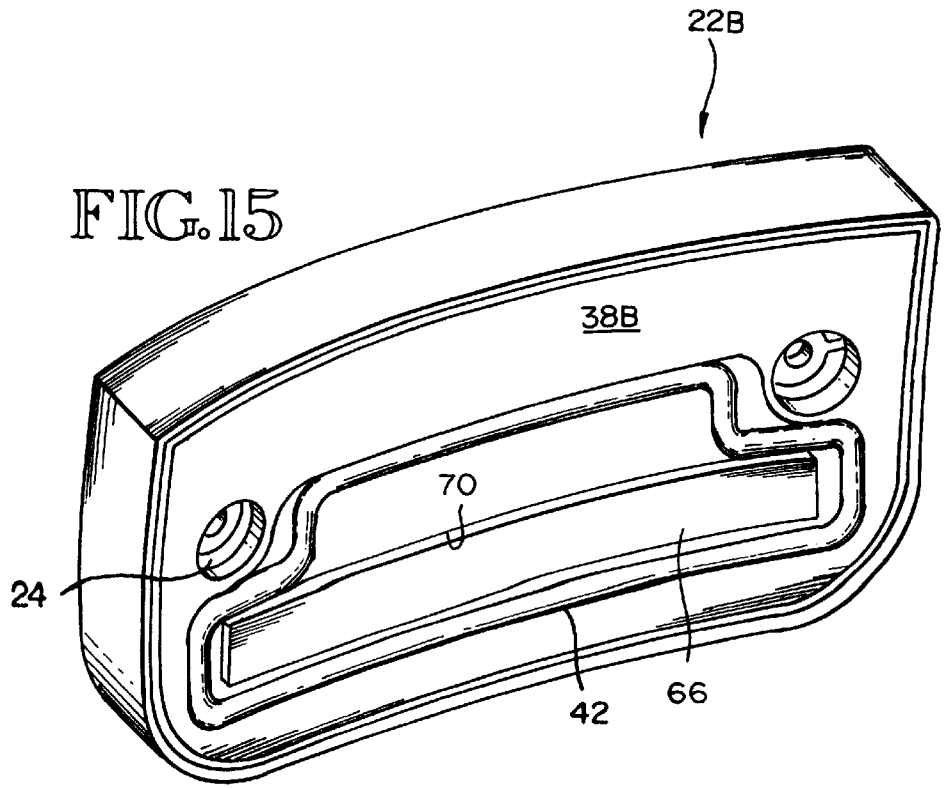
FIG. 15 is a pictorial view looking toward the rear of the door shown in FIG. 14.

FIGS. 14 and 15 illustrate a door 22B for use with the device when the device is being converted to an antenna-less mode of operation. The door 22B shown in FIGS. 14 and 15 lacks an antenna since one is not required for the new mode of operation of the device. However, in order to continue its function of providing a cover for the access opening 14 and sealing the opening 14, the door 22B has an overall structure similar to that of the doors 22, 22A shown in FIGS. 1–13. The door 22B has a rear cover 38B with a configuration similar to the rear cover 38A shown in FIG. 13 but lacking the recess 40 thereof. The recess 40 is not required since there is no antenna and, hence, no antenna cable to be accommodated.

Preferably, the door 22B includes a slot 70 extending therethrough and aligning with the access opening 14. The slot 70 permits a memory card 18 to be moved into and out from the interior space 12 of the device 2 through the slot 70 and the access opening 14 without removing the door 22B from the outer surface of the shell 10. The door 22B is preferably provided with a removable plug that is positionable in the slot 70 to protect the space 12 from contaminants. As shown in FIGS. 14 and 15, the plug 66 is simply a generally T-shaped rubber plug with a head 68. The smaller end of the plug 66 is moved into the front of the slot 70 through the front wall of the door 22B and moved into the portion of the slot 70 through the rear cover 38B.

Preferably, the rear surface of the plug 66 is substantially flush with the rear surface of the cover 38B to prevent the plug 66 from interfering with the sealing engagement of the gasket 42 with the shell 10. As shown, the rear of the plug 66 projects slightly out from the rear end of the slot 70. When the door 22B is mounted on the shell 10, the gasket 42 sealingly engages the outer surface of the shell 10 in the manner described above. The plug 66 closes and seals the slot 70. When it is desired to change the memory card 18 in the device 2, all that is required is to remove the plug 66, replace the card, and then reposition the plug 66 in the door 22B.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A scanning device comprising:
   a housing having an outer shell defining an interior space and an access opening extending through said shell and communicating with said space for receiving an often serviced component therethrough;
   a door removably secured to an outer surface of said shell and covering said access opening; and an antenna carried by said door and having an antenna cable extending therefrom into said space, said cable having an outer end with a connector configured to engage a component of the scanning device located in said space;

the scanning device having a plurality of components, each said component, other than said antenna, being located in said space when said door is secured to said shell and when said door is removed from said shell.

2. The device of claim 1, comprising a pair of screw-type fasteners extending through said door and threadedly engaging said shell to removably secure said door to said shell.

3. The device of claim 1, in which said antenna is pivotally mounted on said door.

4. The device of claim 3, in which said antenna is pivotable by a user, when said door is secured to said shell, between a lowered position adjacent and parallel to, and extending along, an edge of said door, and a raised position projecting substantially perpendicularly from said edge along said outer surface of said shell; said antenna having an outer free end that engages said edge, when said antenna is in said lowered position, to prevent undesired deflection of said antenna.

5. The device of claim 1, comprising a gasket carried by said door and sealingly engaging said outer surface of said shell, said gasket being positioned and configured to surround said access opening to prevent entry of environmental contaminants into said opening.

6. The device of claim 5, in which said gasket surrounds an area of said outer surface including said access opening, and said device comprises a pair of screw-type fasteners extending through said door and threadedly engaging said shell outside said area to removably and sealingly secure said door to said shell.

7. The device of claim 6, in which said door has a recess thereon surrounded by said gasket and positioned to substantially align with said access opening, said cable extending from said door through said recess, and said recess being configured to receive excess length of said cable.

8. The device of claim 5, in which said door has a recess thereon surrounded by said gasket and positioned to substantially align with said access opening, said cable extending from said door through said recess, and said recess being configured to receive excess length of said cable.

9. The device of claim 1, in which said door has a recess thereon positioned to confront and substantially align with said access opening, said cable extending from said door through said recess, and said recess being configured to receive excess length of said cable.

10. The device of claim 1, in which said antenna is mounted internally in said door.

11. A scanning device comprising:

a scanner housing having an outer shell defining an interior space and an access opening extending through said shell and communicating with said space for receiving an often serviced component therethrough;

a door removably secured to an outer surface of said shell and covering said access opening; and an antenna carried by said door and having a cable extending therefrom into said space, said cable having an outer end with a connector configured to engage a component located in said space;

in which said antenna is mounted internally in said door.

12. A hand-held scanning device comprising:

a housing of the scanning device, said housing having an outer shell defining an interior space and an access opening extending through said shell and communicating with said space for receiving a memory card therethrough;

a door removably secured to an outer surface of said shell and covering said access opening; and an antenna carried by said door and having an antenna cable extending therefrom into said space, said cable having an outer end with a connector configured to engage a memory card component of the scanning device located in said space;

the scanning device having a plurality of components, each said component, other than said antenna, being located in said space when said door is secured to said shell and when said door is removed from said shell.

13. The device of claim 12, comprising a pair of screw-type fasteners extending through said door and threadedly engaging said shell to removably secure said door to said shell.

14. The device of claim 12, in which said antenna is pivotally mounted on said door.

15. The device of claim 14, in which said antenna is pivotable by a user, when said door is secured to said shell, between a lowered position adjacent and parallel to, and extending along, an edge of said door, and a raised position projecting substantially perpendicularly from said edge along said outer surface of said shell; said antenna having an outer free end that engages said edge, when said antenna is in said lowered position, to prevent undesired deflection of said antenna.

16. The device of claim 12, comprising a gasket carried by said door and sealingly engaging said outer surface of said shell, said gasket being position ed and configured to surround said access opening to prevent entry of environmental contaminants into said opening.

17. The device of claim 16, in which said gasket surrounds an area of said outer surface including said access opening, and said device comprises a pair of screw-type fasteners extending through said door and threadedly engaging said shell outside said area to removably and sealingly secure said door to said shell.

18. The device of claim 17, in which s aid door has a recess thereon surrounded by said gasket and positioned to substantially align with said access opening, said cable extending from said door through said recess, and said recess being configured to receive excess length of said cable.

19. The device of claim 16, in which said door has a recess thereon surrounded by said gasket and positioned to substantially align with said access opening, said cable extending from said door through said recess, and said recess being configured to receive excess length of said cable.

20. The device of claim 12, in which said door has a recess thereon positioned to confront and substantially align with said access opening, said cable extending from said door through said recess, and said recess being configured to receive excess length of said cable.

21. The device of claim 12, in which said antenna is mounted internally in said door.

22. A hand-held scanning device comprising:

a scanner housing having an outer shell defining an interior space and an access opening extending through said shell and communicating with said space for receiving a memory card therethrough;

a door removably secured to an outer surface of said shell and covering said access opening; and an antenna carried by said door and having a cable extending therefrom into said space, said cable having an outer end with a connector configured to engage a memory card located in said space;

in which said antenna is mounted internally in said door.

23. A method of providing a hand-held scanning device of a type having a shell defining an interior space, a plurality of components located in the space, and an access opening communicating with the space with a field-replaceable antenna and enabling switching the mode of operation of the device in the field, said method comprising:

providing a door to cover and seal the access opening;

positioning a memory card component in the space through the access opening;

mounting an antenna on the door;

connecting said antenna to said card component; and securing said door to an outer surface of the shell, including covering the access opening with said door;

wherein each component of the device, other than said antenna, is located in the space when said door is secured to the shell and when said door is separate from the shell.

24. The method of claim 23, wherein said antenna is externally and pivotally mounted on said door.

25. The method of claim 23, further comprising replacing said door with a second door lacking an antenna to switch the device to an antenna-less mode of operation, including providing said second door with a slot and aligning said slot with the access opening to permit a memory card to be moved into and out from the space through said slot and the access opening without removing said second door from said outer surface, and placing a removable plug in said slot to protect the space from contaminants.

26. A method of providing a hand-held scanning device of a type having a shell defining an interior space and an access opening communicating with the space with a field-replaceable antenna and enabling switching the mode of operation of the device in the field, said method comprising:

providing a door;

positioning a memory card in the space through the access opening;

mounting an antenna on the door;

connecting said antenna to said card; and securing said door to an outer surface of the shell, including covering the access opening with said door;

wherein said antenna is mounted internally in said door.

* * * * *

UNITED STATES PATENT AND TRADEMARK OFFICE
CERTIFICATE OF CORRECTION

PATENT NO. : 6,213,400 B1
DATED : April 10, 2002
INVENTOR(S) : Robert A. Zigler and Edward L. Sheufelt Page 1 of 1

It is certified that error appears in the above-identified patent and that said Letters Patent is hereby corrected as shown below:

<u>Column 8,</u>
Line 32, "position ed" should be -- positioned --.
Line 41, "s aid" should be -- said --.

Signed and Sealed this

Twenty-eighth Day of May, 2002

Attest:

JAMES E. ROGAN
*Attesting Officer*     *Director of the United States Patent and Trademark Office*